United States Patent [19]

Kumura et al.

[11] Patent Number: 4,679,466
[45] Date of Patent: Jul. 14, 1987

[54] LINE PRESSURE CONTROL DEVICE FOR HYDRAULIC CONTROL SYSTEM OF AUTOMATIC TRANSMISSION

[75] Inventors: Haruyoshi Kumura, Yokohama; Keiju Abo, Yokosuka; Hiroyuki Hirano, Yokohama; Sigeaki Yamamuro, Zushi; Masaki Nakano, Kawasaki, all of Japan

[73] Assignee: Nissan Motor Co., Ltd., Yokohama, Japan

[21] Appl. No.: 835,060

[22] Filed: Feb. 28, 1986

[30] Foreign Application Priority Data

Mar. 8, 1985 [JP] Japan .................................. 60-44581
Apr. 1, 1985 [JP] Japan .................................. 60-66567

[51] Int. Cl.⁴ ...................... B60K 41/04; F01B 19/02
[52] U.S. Cl. ........................................ 74/863; 74/867; 92/48; 92/65; 137/625.66
[58] Field of Search ................ 74/863, 867, 868, 869; 92/48, 64, 65; 137/625.66

[56] References Cited

U.S. PATENT DOCUMENTS 3,065,997 11/1962 Frankhouser et al. ............. 92/64 X
3,397,621 8/1968 Groves ................................... 92/48
3,688,606 9/1972 Lemieux et al. ..................... 74/863

FOREIGN PATENT DOCUMENTS 59-77155 5/1984 Japan .

Primary Examiner—Allan D. Herrmann
Attorney, Agent, or Firm—Schwartz, Jeffery, Schwaab, Mack, Blumenthal & Evans

[57] ABSTRACT

In a line pressure control device for a hydraulic control system of an automatic transmission, a vacuum diaphram unit is constructed to apply upon a valve spool of a throttle valve or a regulator valve such a force that reduces with increasing intake manifold vacuum when the intake manifold vacuum is lower than a first predetermined value and such a force that increases with increasing intake manifold vacuum when the intake manifold vacuum is higher than a second predetermined value.

12 Claims, 14 Drawing Figures

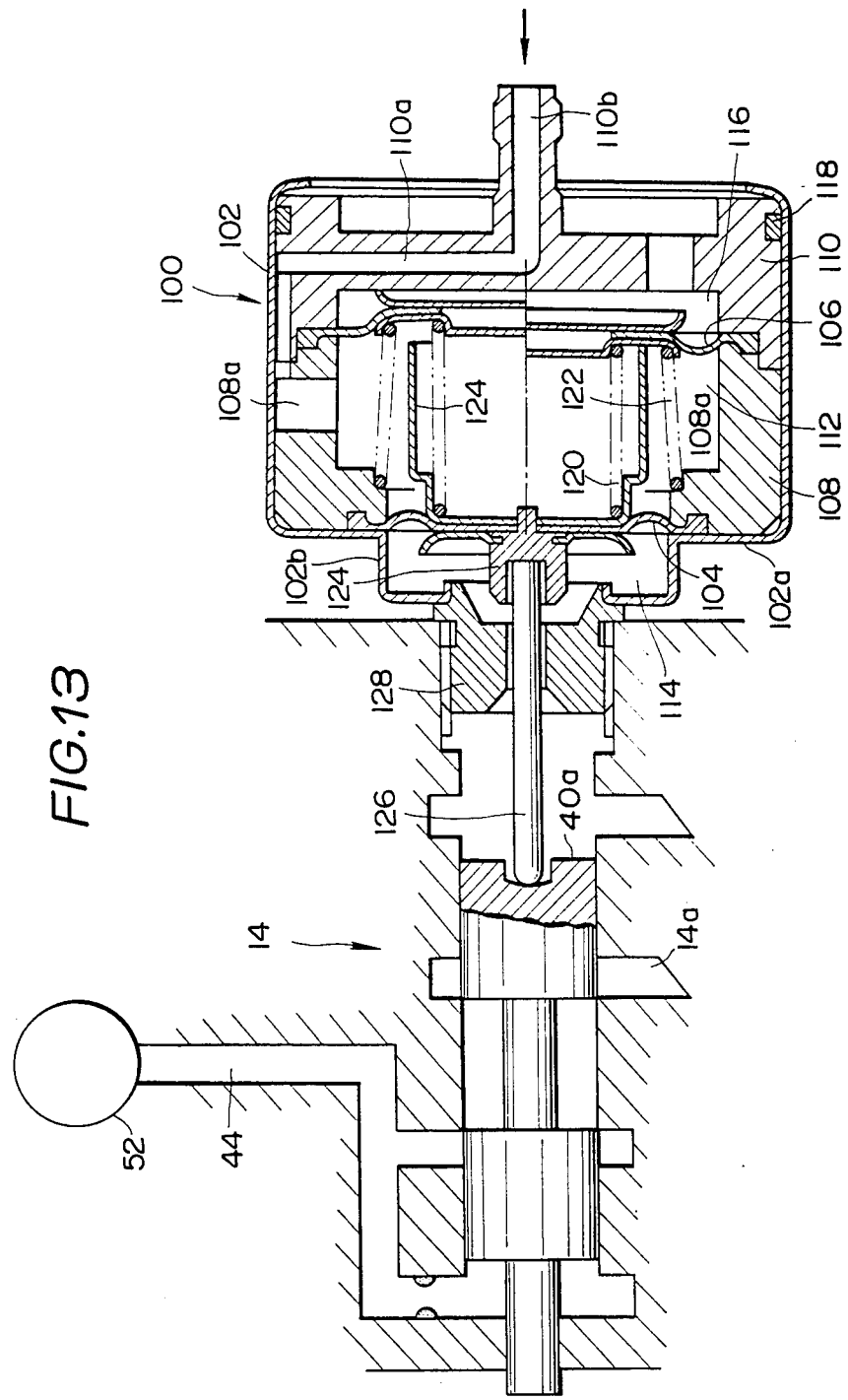

LINE PRESSURE CONTROL DEVICE FOR HYDRAULIC CONTROL SYSTEM OF AUTOMATIC TRANSMISSION

BACKGROUND OF THE INVENTION

1. Field of the Invention

The present invention relates in general to hydraulic control systems of automatic transmission and more particularly to line pressure control devices therefor.

2. Description of the Prior Art

An example of a prior art line pressure control device is disclosed in the Japanese Provisional Patent Publication No. 59-77155. With the prior art device, line pressure is controlled based on throttle pressure and transmission gear ratio, while the throttle pressure is controlled based on intake manifold vacuum (engine load), i.e., the throttle pressure decreases with decreasing intake manifold vacuum, while the line pressure is controlled so as not to become smaller than a predetermined minimum value. The line pressure, after decreasing to the predetermined minimum value, is thus held constant irrespective of further increase of the intake manifold vacuum. Such a line pressure variation characteristic is exemplarily shown in the graph of FIG. 14.

Referring to FIG. 14, engine torque varies directly with the intake manifold vacuum as indicated by the solid line, i.e., the engine torque increases to a maximum value when the intake manifold vacuum decreases to zero (or when the intake manifold pressure decreases to a certain positive value in the case of a turbo-charger being employed) and decreases to zero when the intake manifold vacuum increases to a certain value, e.g. 400 mmHg as shown in the graph of FIG. 14. Under engine brake conditions (i.e. under driving conditions where engine output torque is negative), the intake manifold vacuum increases further. Even under such engine brake conditions, the clutches of the transmission or pulleys in the case of the continuously variable V-belt type are needed to have such torque transmission capacities that match the engine brake torque, i.e., needed to be able to transmit such torque that is represented by the dotted line in the graph of FIG. 14. The dotted line and the negative part of the engine torque line are symmetrical with respect to the axis of abscisa. For this reason, the throttle pressure and the line pressure corresponding to the intake manifold vacuum of around 400 mmHg become larger than needed. Since the intake manifold vacuum range of around 400 mmHg is most frequently used under ordinary driving, the line pressure higher than needed under that vacuum range inevitably results in an increased loss of the oil pump and therefore a lowered efficiency of the transmission. This is particularly true when the line pressure control device is used in a continuously variable V-belt transmission.

SUMMARY OF THE INVENTION

In accordance with the present invention, there is provided a novel and improved line pressure control device for a hydraulic control system of an automatic transmission.

The line pressure control device comprises a fluid pump for producing a line pressure, line pressure passage means for distributing the line pressure, a source of intake manifold vacuum, a vacuum diaphragm unit connected to the source of intake manifold vacuum for producing a force variable depending upon variation of the intake manifold vacuum, and a control valve connected to the line pressure means and having a valve spool movable to regulate the line pressure based upon the force applied thereto from the vacuum diaphragm unit. The above structure may substantially follow the conventional fashion.

In accordance with the present invention, the vacuum diaphragm unit including a casing, parallel first and second diaphragms disposed within the casing, vacuum chamber means defined within the casing by one sides of the first and second diaphragms, atmospheric pressure chamber means defined within the casing by the other sides of the first and second diaphragms in such a manner that the first diaphragm is subject to a differential pressure by which it is urged away from the valve spool while the second diaphragm is subject to a differential pressure by which it is urged toward the valve spool, spring means for urging the first diaphragm toward the valve spool while the second diaghragm away from the valve spool, and rod means for connecting the first and second diaphragms to the valve spool, in which the first and second diaphrams, the spring means and the rod means are constructed and arranged so that the force which reduces as the intake manifold vacuum increases is supplied from the first diaphragm to the valve spool through the rod means when the intake manifold vacuum is lower than a first predetermined value while the force which increases as the intake manifold vacuum increases is supplied from the second diaphram to the valve spool through the rod means when the intake manifold vacuum is higher than a second predetermined value.

The above structure is quite effective for overcoming the above noted disadvantages and shortcomings inherent in the prior art device.

It is accordingly an object of the present invention to provide a novel and improved line pressure control device for a hydraulic control system of an automatic transmission which can regulate line pressure precisely in accordance with the torque transmission demand.

It is another object of the present invention to provide a novel and improved line pressure control device of the above described character which can reduce the loss of its oil pump and improve the efficiency of the transmission.

It is a further object of the present invention to provide a novel and improved line pressure control device of the above described character which can improve the torque transmission efficiency when used in a continuously variable V-belt transmission.

BRIEF DESCRIPTION OF THE DRAWINGS

The features and advantages of the line pressure control device according to the present invention will become more clearly appreciated from the following description taken in conjunction with the accompanying drawings, in which:

FIG. 13 is a view similar to FIG. 10 but showing a further modified embodiment of the present invention.

DETAILED DESCRIPTION OF THE PREFERRED EMBODIMENTS

Figure 1:
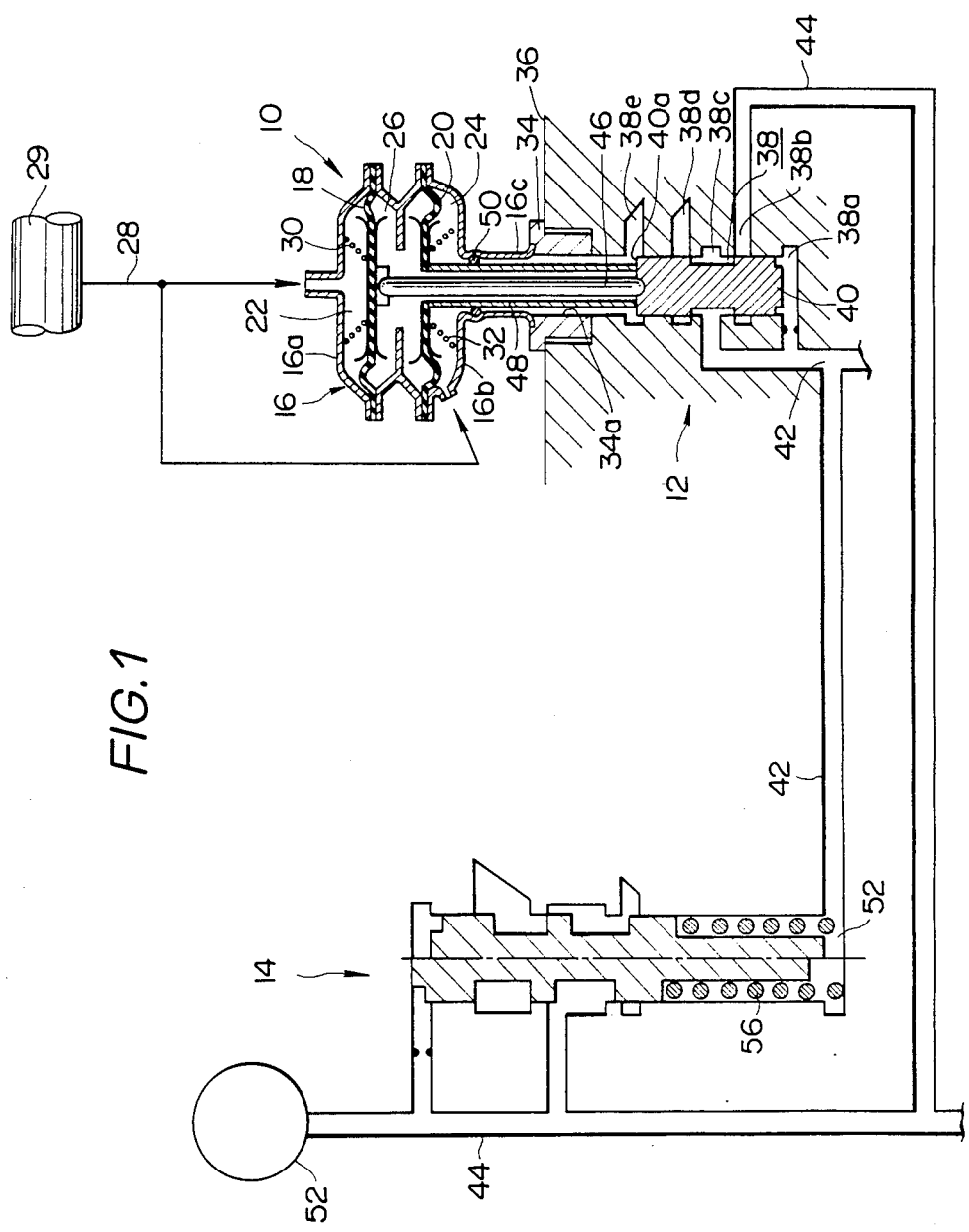
FIG. 1 is a schematic sectional view of a line pressure control device according to an embodiment of the present invention.

Referring now to FIG. 1, a line pressure control device consists of a vacuum diaphragm unit 10, a throttle valve 12 for producing throttle pressure and a regulator valve 14 controlled by the throttle pressure. The vacuum diaphragm unit 10 includes an annular casing 16 and within the casing 16 two diaphragms, i.e., a first diaphragm 18 and a second diaphragm 20 axially dividing the inside of the casing 16 into three chambers, i.e., a first vacuum chamber 22, second vacuum chamber 24 and atmospheric pressure chamber 26 between the first and second vacuum chambers 22 and 24. More specifically, the first vacuum chamber 22 is defined between a first axial end 16a of the casing 16 and the first diaphragm 18. The second vacuum chamber 24 is defined between a second axial end 16b of the casing 16 and the second diaphragm 20. The first and second diaphrams 18 and 20 have substantially the same effective area. The atmospheric pressure chamber 26 is defined between the first and second diaphrams 18 and 20. The first and second vacuum chambers 22 and 24 are communicated through a conduit 28 to an engine intake manifold 29 so as to introduce intake manifold vacuum thereinto. The atmospheric pressure chamber 26 is in constant communication with the open air. A first coil spring 30 is received in the first vacuum chamber 22 and interposed between the first axial end 16a of the casing 16 and the first diaphragm 18 so as to urge the first diaphragm 18 downward in the drawing. A second coil spring 32 is received in the second vacuum chamber 24 and interposed between the second axial end 16b of the casing 16 and the second diaphragm 20 so as to urge the second diaphragm 20 upward in the drawing. The casing 16 has at the second axial end 16b thereof an integral connecting pipe 16c which is concentrically provided thereto and projects outward therefrom to terminate in an outward end. The vacuum diaphram unit 10 also includes a plug member 34 integrally attached to the outward end of the connecting pipe 16c. The vacuum diaphram unit 10 is secured to a valve body 36 by screwing the plug member 34 thereinto. The plug member 34 is hollow and has a central bore 34a axially aligned with the connecting tube 16c.

The throttle valve 12 consists of a stepped bore 38 formed in the valve body 36 and a valve spool 40 disposed in the valve bore 38. The vacuum diaphram unit 10 is secured to the valve body 36 in such a manner as to be axially aligned or in line with the valve bore 38. The valve bore 38 is provided with five ports 38a–38e. The ports 38a and 38c are communicated with a conduit 42 for delivery of throttle pressure. The ports 38d and 38e are drain ports. The valve spool 40 which moves above and below the position shown in FIG. 1 allows the port 38d to drain part of fluid supplied from an oil pump 52 to the port 38b and thereby regulate the fluid pressure in the port 38a so that the fluid pressure in the conduit 42 is balanced with a force supplied from the vacuum diaphram unit 10 to the valve spool 40 as will be described hereinafter.

Concentric first and second rods 46 and 48 are provided for transmission of forces from the first and second diaphrams 18 and 20 to the valve spool 40. The second rod 48 extends through the connecting pipe 16c and the plug member 34 to have an end bonded or otherwise sealingly secured to the second diaphram 20 and the other end abuttingly engageable with an end 40a of the valve spool 40. A sealing member 50 is interposed between the connecting pipe 16c of the casing 16 and the second rod 48 to hermetically seal the second vacuum chamber 24. The first rod 46 is received in the second rod 48 and extends therethrough to have opposite ends abuttingly engageable with the first diaphragm 18 and the end 40a of the valve spool 40, respectively.

The regulator valve 14 is of the conventional type and controls the output pressure of the oil pump 52 (i.e. line pressure in the conduit 44) based on throttle pressure supplied to a port 54 through the conduit 42 and a bias of a spring 56. The port 38b of the throttle valve 12 is in fluid communication with the outlet of the oil pump 52 through the conduit 44.

Figure 2:
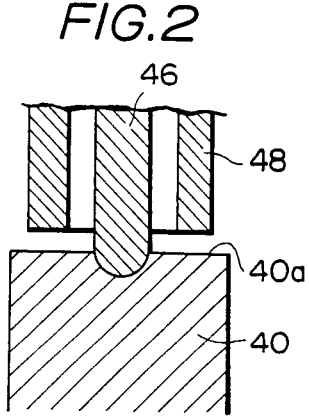
FIG. 2 is an enlarged fragmentary view of a first rod and second rod employed in the line pressure control device of FIG. 1 and shown in relative positions to which they are put when intake manifold vacuum is relatively small.
Figure 3:
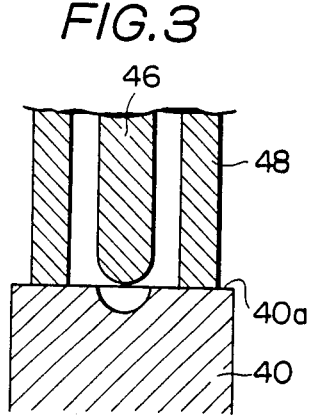
FIG. 3 is a view similar to FIG. 2 but showing the first and second rods in positions to which they are put when the intake manifold vacuum is relatively large.
Figure 4:
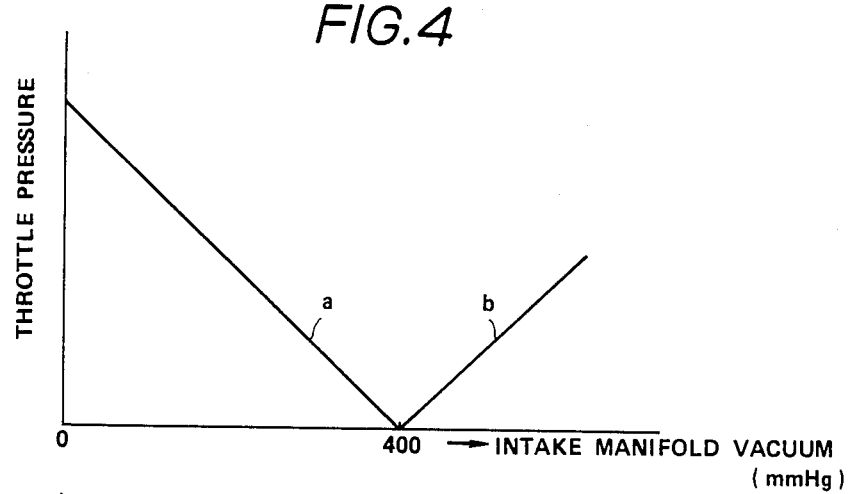
FIG. 4 is a graph showing a throttle pressure variation characteristic effected by the line pressure control device of FIG. 1.

The line pressure control device thus far described operates as follows. When the intake manifold vacuum is relatively low (i.e. near the atmospheric pressure), the difference in pressure between the second vacuum chamber 24 and the atmospheric pressure 26 is small. Due to this, the differential pressure acting on the second diaphram 20 to urge the same toward the valve spool 40 is small, resulting in that the second diaphram 20 is put into a state of being urged away from the valve spool 40 under the bias of the spring 32. By this, the second rod 48, as shown in an enlarged scale in FIG. 2, is caused to move away from the end 40a of the valve spool 40 so as not to apply any force thereupon. When this is the case, the difference in pressure between the first vacuum chamber 22 and the atmospheric pressure chamber 26 is also small. Due to this, the differential pressure acting on the first diaphragm 18 is small, resulting in that the first diaphragm 18 is put into a state of being urged toward the valve spool 40 under the bias of the spring 30. The force supplied from the first diaphram 18 to the valve spool 40 is therefore inversely proportional to intake manifold vacuum. A force is supplied from the first diaphram 18 to the valve spool 40 through engagement of the first rod 40 with the valve spool 40 as shown in FIG. 2. Since the throttle valve 12 is adapted to control the fluid pressure in the conduit 42 (i.e. throttle pressure) based on the force supplied from the vacuum diaphram unit 10 to the valve spool 40, the throttle pressure progressively decreases with increasing intake manifold vacuum as represented by the line "a" in the graph of FIG. 4. When the intake manifold vacuum increases up to a predetermined first value (e.g. 400 mmHg as shown in the graph of FIG. 4), the force supplied from the first rod 46 to the valve spool 40 becomes zero, causing the throttle pressure to become zero. Further increase of the intake manifold vacuum up to a second predetermined value (in this embodiment the second predetermined value is equal to the first predetermined value) makes the differential pressure acting on the second diaphram 20 equal to the bias of the spring 32. When the intake manifold vacuum increases further beyond the second predetermined value, the second rod 48 comes in contact with the end 40a of the valve spool 40 to apply a force upon the same. When this is the case, the first rod 46 is held disengaged from the valve spool 40 so as not to apply any force upon the same as shown in FIG. 3. The force supplied from the second diaphram 20 through the second rod 48 to the valve spool 40 increases with increasing intake manifold beyond the second predetermined value as represented by the line "b" in the graph of FIG. 4.

Figure 5:
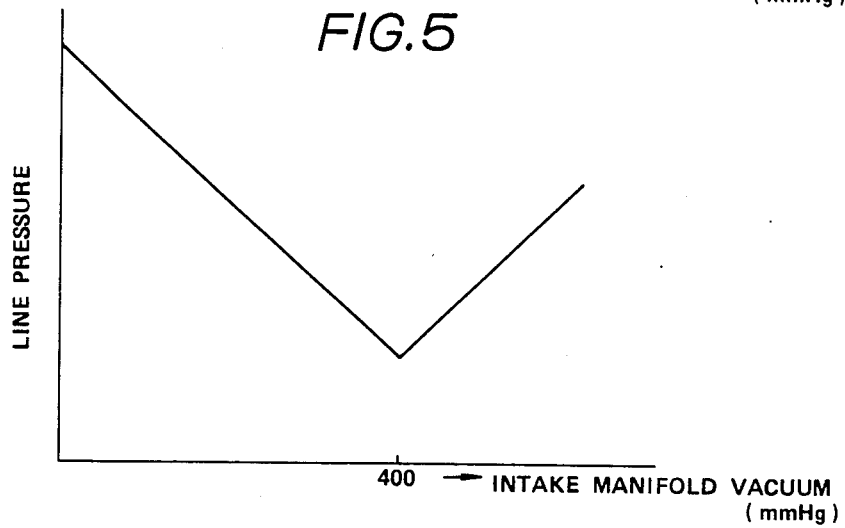
FIG. 5 is a graph showing a line pressure variation characteristic effected by the line pressure control device of FIG. 1.

It is therefore to be understood that such a throttle pressure variation characteristic as shown in FIG. 4 is obtained by the line pressure control device of the present invention. The throttle pressure in the conduit 42 is supplied to the port 54 of the regulator valve 14 to control the line pressure in the conduit 44 so that the line pressure is given such a variation characteristic as shown in FIG. 5. The line pressure variation characteristic well matches the theoretical torque transmission demand. By this, throughout the overall intake manifold vacuum range, the line pressure can be regulated optimumly and does not become higher than needed, thus making it possible to reduce the loss of the oil pump 52 and improve the efficiency of the transmission. In the case of the continuously variable V-belt type, an improved torque transmission efficiency is attained.

Figure 6:
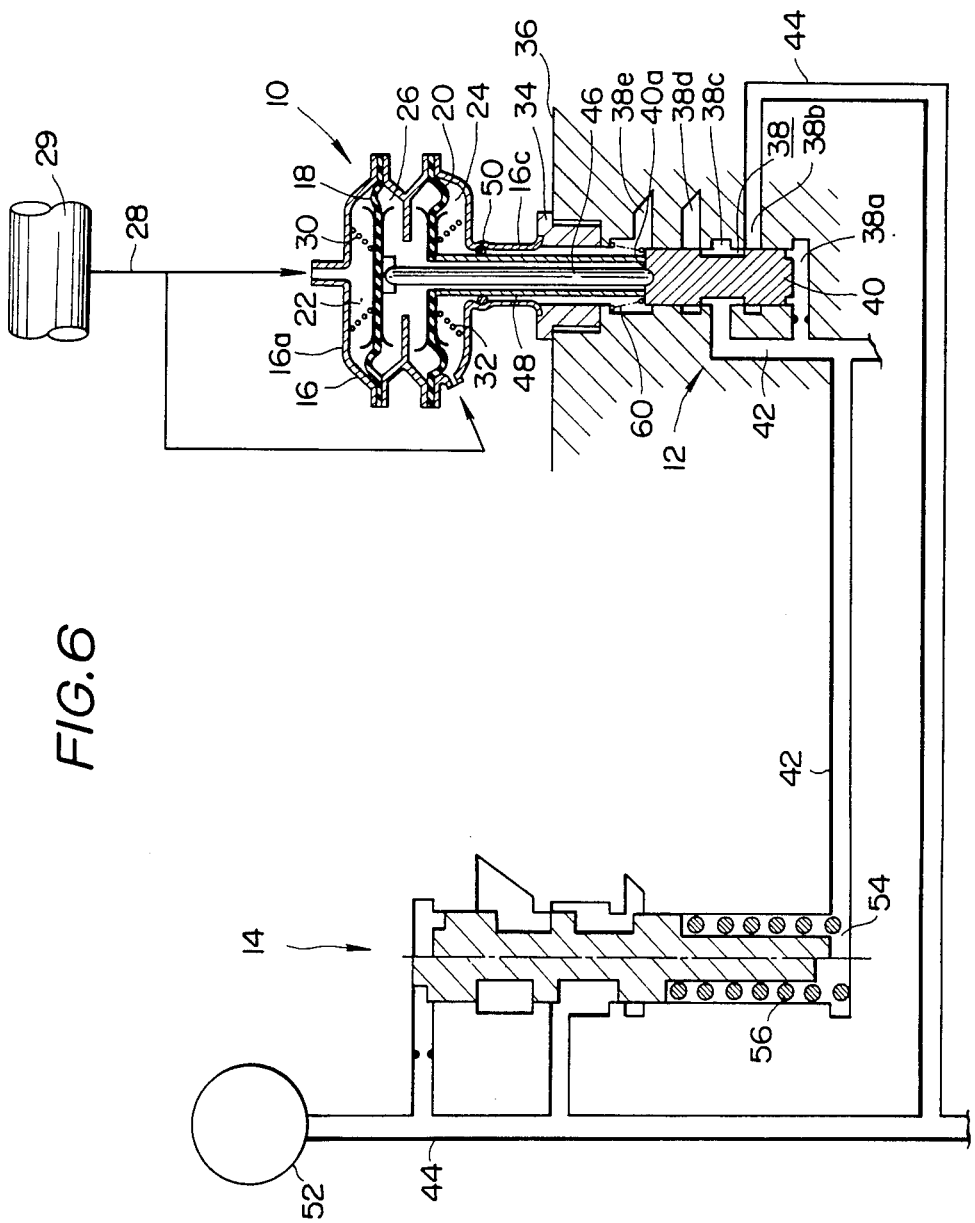
FIG. 6 is a view similar to FIG. 1 but showing a modified embodiment of the present invention.
Figure 7:
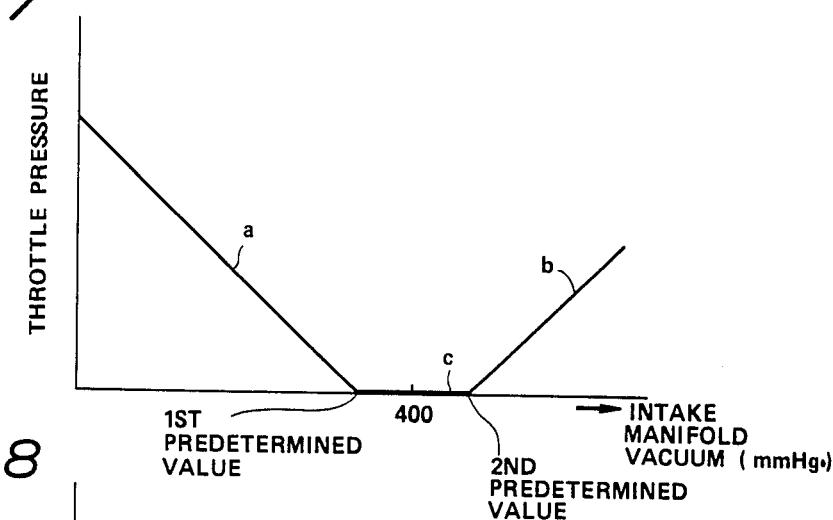
FIG. 7 is a graph showing a throttle pressure variation characteristic effected by the second embodiment of FIG. 6.
Figure 8:
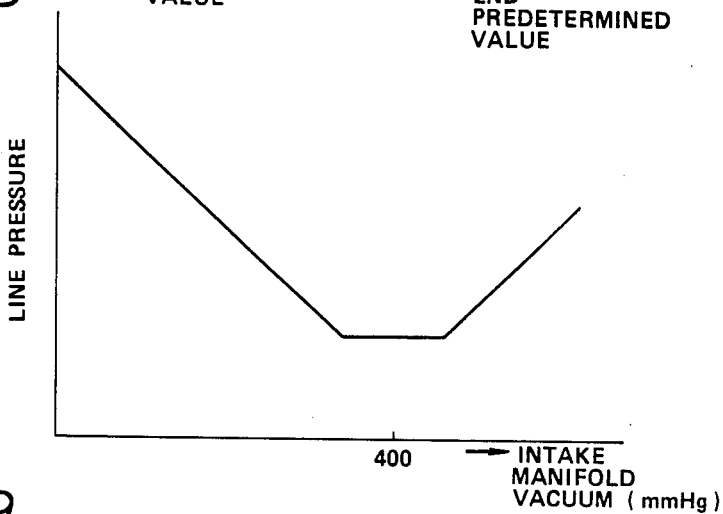
FIG. 8 is a graph showing a line pressure variation characteristic effected by the embodiment of FIG. 6.
Figure 9:
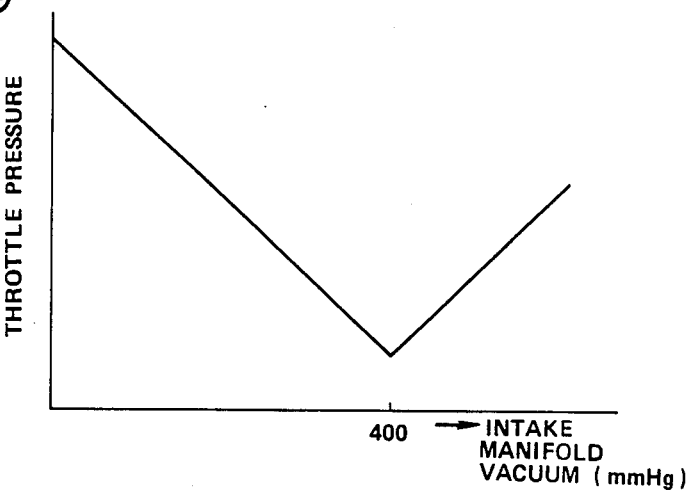
FIG. 9 is a graph showing another throttle pressure variation characteristic effected by the embodiment of FIG. 6.

A modified embodiment is shown in FIG. 6 in which like or corresponding parts to those of the previous embodiment of FIG. 1 are designated by the like reference characters. This emboidment differs from the previous embodiment in that a coil spring 60 is interposed between the end 40a of the valve spool 40 and a shoulder 38f of the valve bore 38 so as to urge the valve spool 40 away from the vacuum diaphram unit 10 and that the intensities or spring constants of the springs 30' and 32' are determined so that the first predetermined value at which the force supplied from the first diaphram 18 to the valve spool 40 becomes zero is smaller than the second predetermined value at which the force supplied from the second diaphram 20 to the valve spool 40 becomes zero. Except for the above, this embodiment is substantially the same as the previous embodiment. By this, the throttle pressure can be maintained at a constant value as represented by the line "c" in FIG. 7 when neither of the first and second diaphrams 18 and 20 applies any force upon the valve spool 40 (i.e. when the intake manifold vacuum ranges between the first and second predetermined values). This embodiment can effect such a throttle pressure variation characteristic as shown in FIG. 7 and such a line pressure variation characteristic as shown in FIG. 8. The line pressure variation characteristic well matches the torque transmission demand. FIG. 9 shows a throttle pressure variation characteristic which is attained when the springs 30' and 32' are designed to have the same intensities or spring constants as those of the springs 30 and 32 of the previous embodiment.

Figure 10:
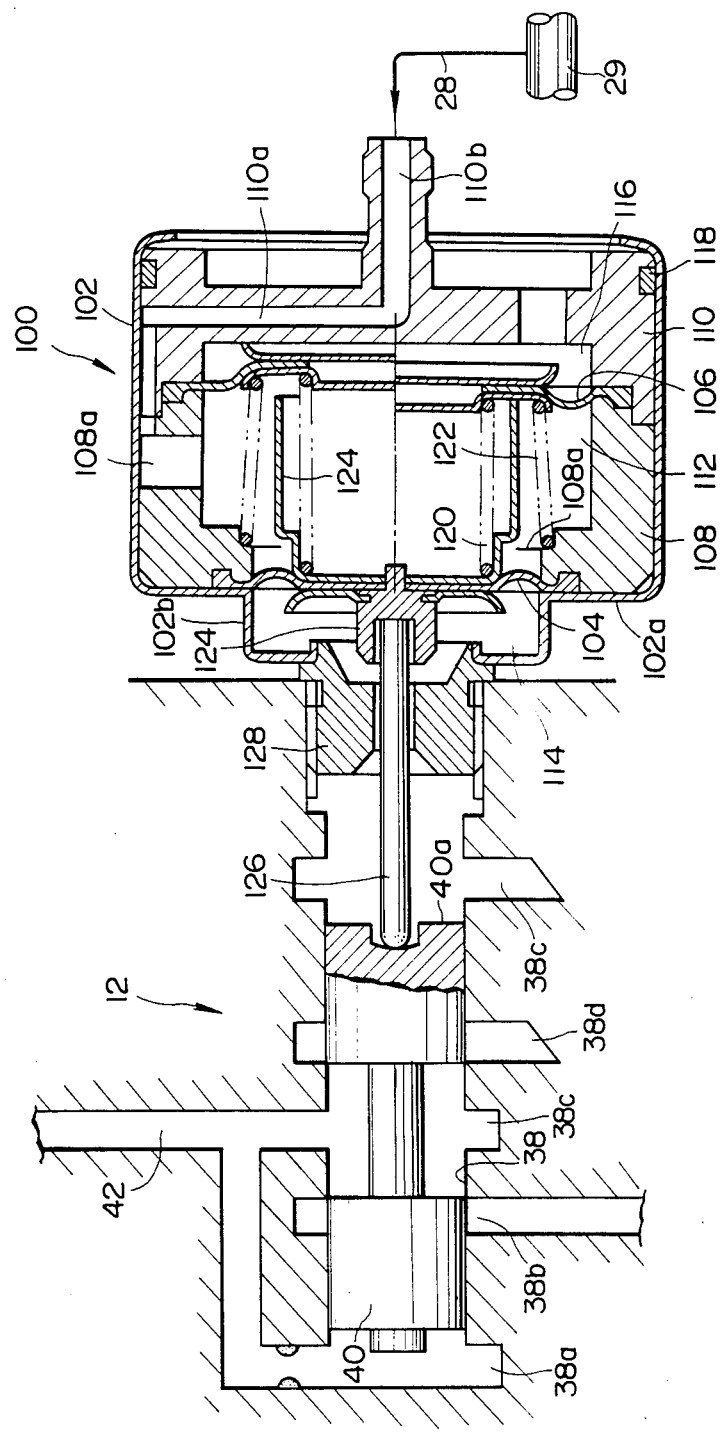
FIG. 10 is a schematic sectional view of another modified embodiment of the present invention, with some parts being omitted.

Another modified embodiment is shown in FIG. 10 in which like or corresponding parts to those of the previous embodiment of FIG. 1 are designated by the like reference numerals and in which the regulator valve 14, oil pump 52, etc. are omitted for brevity. This embodiment differs from the previous embodiment of FIG. 1 in that a vacuum diaphram unit 100 of the different type is employed. The vacuum diaphram unit 100 includes an annular casing 102 and within the casing 102 two parallel diaphrams, i.e., a first diaphram 104 and a second diaphram 106. The second diaphram 106 is sealingly and fixedly clamped at the outer periphery thereof by first and second annular clamping members 108 and 110 which are in turn stationarily held within the casing 102. The first diaphram 104 is sealingly and fixedly clamped at the outer periphery thereof between an end 102a of the casing 102 and first clamping member 108. A vacuum chamber 112 is defined within the casing 102 and between the first and second diaphrams 104 and 106. A first atmospheric pressure chamber 114 is defined within the casing 102 and on the side of the first diaphram 104 opposite to the vacuum chamber 112. To this end, the casing 102 has at the end 102a thereof an annular outward boss portion 102b within which the first atmospheric pressure chamber 114 is defined. A second atmospheric pressure chamber 116 is defined within the casing 102 and on the side of the second diaphram 106 opposite to the vacuum chamber 112. The second diaphram 106 has an effective area which is two times larger than that of the first diaphram 104. The vacuum chamber 112 is communicated with the engine intake manifold 29 through a passage 108a formed in the first clamping member 108, a passage 110a and a vacuum inlet 110b formed in the second clamping member 110 and through the conduit 28. A sealing member 118 is interposed between the outer circumferential periphery of the second clamping member 110 and the inner circumferential wall of the casing 102 to provide a seal therebetween. A first coil spring 120 is interposed between the first and second diaphrams 104 and 106 to urge the same away from each other. A second coil spring 122 is interposed between the second diaphram 106 and a shoulder 108a of the first clamping member 108 to urge the second diaphram 106 away from the first diaphram 104. An annular transfer member 124 is attached at an axial end thereof to the first diaphram 104 to move together therewith. The transfer member 124, as shown in the upper half part of FIG. 10, is disengaged from the second diaphram 106 when the second diaphram 106 is displaced from a certain predetermined position thereof under the bias of the second spring 122 and, as shown in the lower half part of FIG. 10, engageable at the other axial end thereof with the second diaphram 106 when the second diaphram is in the predetermined position thereof. A socket member 124 is received in the first atmospheric pressure chamber 116 and secured to the first diaphram 104 to move together therewith. A rod 126 is screwed at an end thereof into the socket member 124 and abuttingly engageable at the other end thereof with the end 40a of the valve spool 40. The vacuum diaphram unit 100 also includes a plug member 128 integrally attached to the boss portion 102b of the casing 102 and is secured to the valve body 26 by screwing the plug member 128 thereinto. The plug member 128 is hollow and through which the rod 126 extends away from the first diaphram 104 to engage the valve spool 40.

The line pressure control device described above according to another modification of the present invention operates as follows. The vacuum inlet 110b is in fluid communication with the engine intake manifold 29 to introduce intake manifold vacuum into chamber 112 through the passages 110a and 108a. When the intake manifold vacuum is relatively low (i.e. near the atmosheric pressure), the pressure differential between the vacuum chamber 112 and the second atmospheric pressure chamber 116 is small. Due to this, the second diaphram 106 is put into a state of being urged away from the valve spool 40 (i.e. caused to move rightwardly in FIG. 10 into the position shown in the upper half part of the same figure) under the bias of the second spring 122. The transfer member 124 is thus held out of contact with the second diaphram 106, allowing the first and second diaphrams 104 to be in independent relation to each other. Accordingly, the rod 126 is subject to a force which is supplied thereto mainly from the first diaphram 104. At this time, since the difference in pressure between the vacuum chamber 112 and the first atmospheric pressure chamber 114 is small, the differential pressure acting on the first diaphram 104 to urge the same rightward in FIG. 10 or away from the valve spool 40 is small, resulting in that the first diaphram 104 urges the rod 126 leftwardly in FIG. 10 or toward the valve spool 40 under the bias of the first spring 120. The force supplied from the first diaphram 104 to the rod 126 to urge the valve spool 40 leftward in FIG. 10 decreases with increasing vacuum pressure in the vacuum chamber 112, i.e., the force varies inversely proportional to the intake manifold vacuum. The throttle valve 12 regulates the pressure in the conduit 42 (i.e. throttle pressure) based on the force supplied from the rod 126 to the valve spool 40. As a result, the throttle pressure decreases with the increasing intake manifold vacuum as represented by the line "a" in FIG. 4.

When the intake manifold vacuum increases up to a predetermined value (e.g. 400 mmHg as shown in the graph of FIG. 4), the force resulting from the differential pressure acting on the first diaphram 104 is balanced with the bias of the first spring 120, causing the force supplied from the rod 126 to the valve spool 40 to become zero. The throttle pressure therefore becomes zero. At this time, the second diaphram 106 is caused to move leftward in FIG. 10 due to increased differential pressure acting thereon and engages the transfer member 124 as shown in the lower half part of FIG. 10. The second diaphram 106 thus starts applying by way of the transfer member 124 a force directly upon the first diaphram 104 to urge the same leftward in the drawing. The force supplied from the second diaphram 106 to the first diaphram 104 by way of the transfer member 124 increases with increasing intake manifold vacuum. On the other hand, the force resulting from the differential pressure acting on the first diaphram 104 to urge the same rightward in the drawing increases with increasing intake manifold vacuum. However, since the effective area of the second diaphram 106 is larger than that of the diaphram 104, the force resulting from the differential pressure acting on the second diaphram 106 to urge the first diaphram 104 leftward in the drawing increases at the rate larger than that at which the force resulting from the differential pressure acting on the first diaphram 104 to urge the same rightward in the drawing. Accordingly, the rod 126 is urged leftward in the drawing by such a force that increases with increasing intake manifold vacuum beyond the above described predetermined value. By this, the throttle pressure in the conduit 42 increases with increasing intake manifold vacuum as represented by the line "b" in the graph of FIG. 4. Accordingly, this embodiment can produce substantially the same effect as that of the previous embodiment of FIG. 1.

Figure 11:
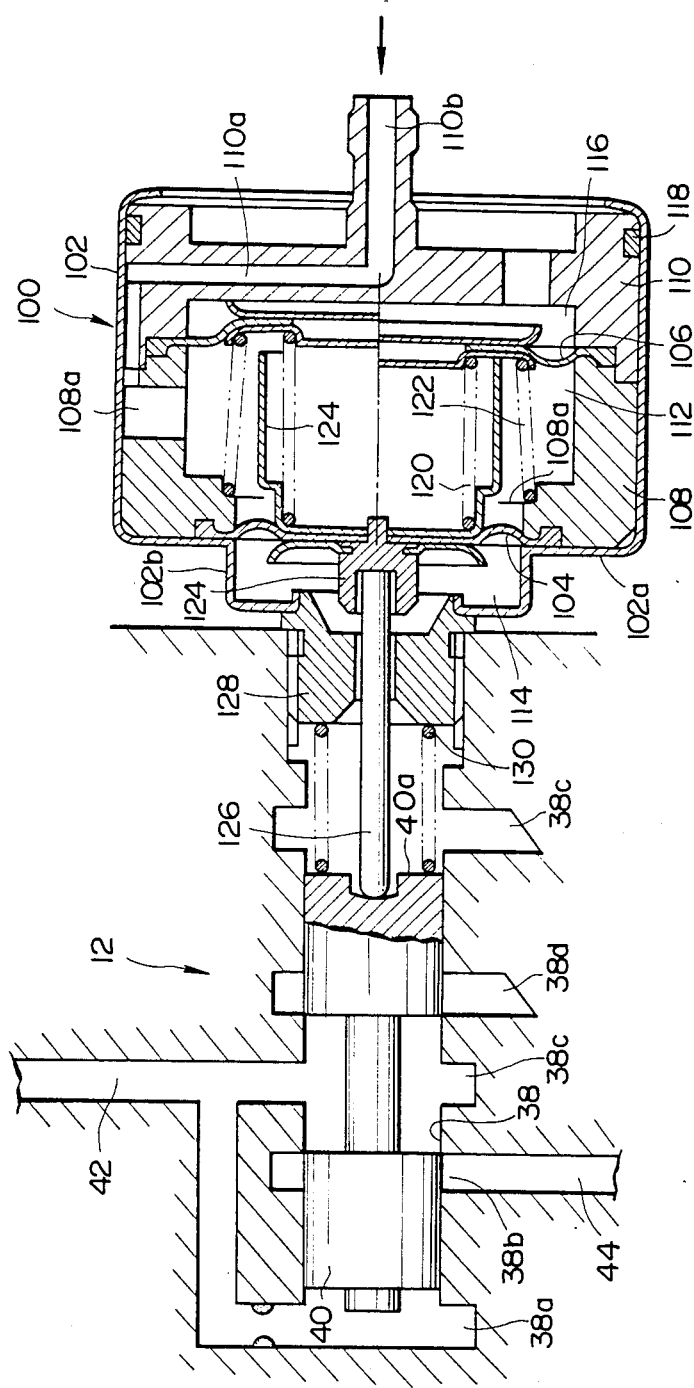
FIG. 11 is a view similar to FIG. 10 but showing a further modified embodiment of the present invention.
Figure 12:
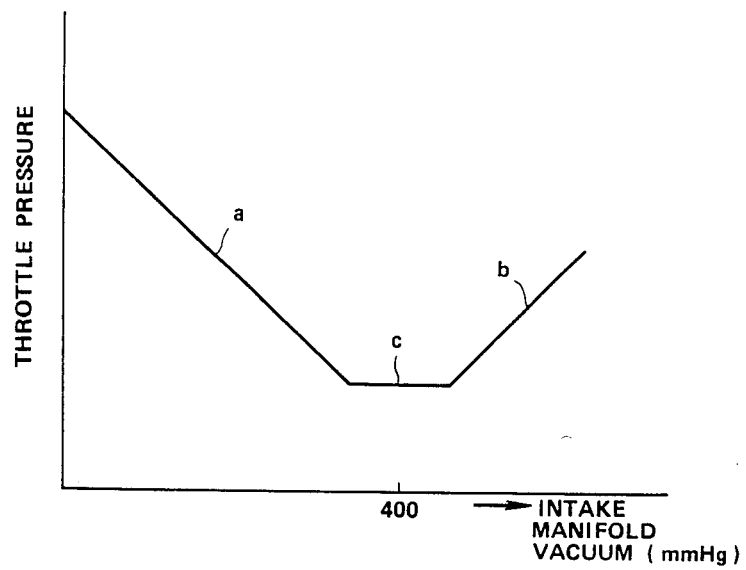
FIG. 12 is a graph showing a throttle pressure variation characteristic effected by the embodiment of FIG. 11.
Figure 14:
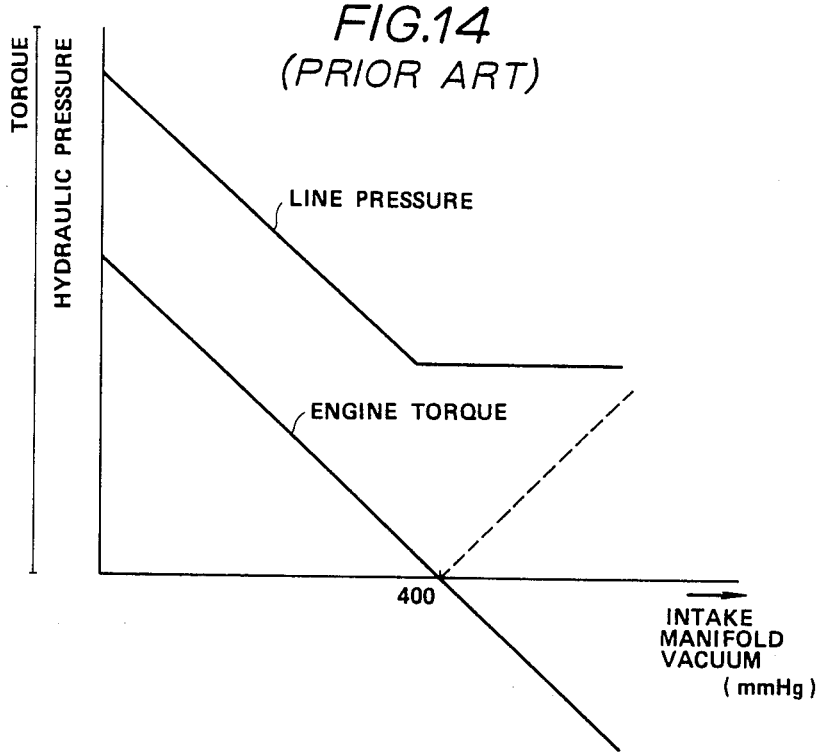
FIG. 14 is a graph showing a line pressure variation characteristic effected by a prior art line pressure control device, together with an engine torque variation characteristic.

FIG. 11 shows a further modified embodiment. This embodiment differs from the previous embodiment of FIG. 10 in that a coil spring 130 is interposed between the end 40a of the valve spool 40 and the plug member 128 to urge the valve spool 40 leftwardly in the drawing, i.e., away from the vacuum diaphram unit 100. This embodiment can effect such a throttle pressure variation characteristic as shown in FIG. 9. In addition to the above, by designing the first and second springs 120 and 122 so that the intake manifold vacuum at which the force resulting from the differential pressure acting on the first diaphram 104 is balanced with the bias of the spring 120 is smaller than the intake manifold vacuum at which the second diaphram 106 is engaged with the transfer member 124, this embodiment can be made to effect such a throttle pressure variation characteristic as shown in FIG. 12. The line "c" in the graph of FIG. 12 represents a range in which neither of the first and second diaphrams 104 and 106 applies any force upon the rod 126 to urge the same toward the valve spool 40, allowing the throttle pressure to be maintained at a constant value. This embodiment therefore can produce substantially the same effect as the previous embodiments. In the above, it is to be understood that the inclinations of the lines "a" and "b" in the graph of FIGS. 9 and 12 can be varied by variously setting the effective areas of the first and second diaphrams 104 and 106. It is further to be understood that the intake manifold vacuum at the transition from the line "a" to line "c" or from the line "c" to line "b" can be varied desiredly in the same manner.

FIG. 13 shows a further modified embodiment. This embodiment differs from the previous embodiment of FIG. 10 in that the vacuum diaphram unit 100 is combined with the regulator valve 14 in place of the throttle valve 12. The regulator valve 14 is of the conventional type and adapted to drain part of the fluid pressure in the conduit 44 to a drain port 14a and thereby control the pressure in the conduit 44, i.e., line pressure. The line pressure in the conduit 44 is balanced with the force acting on the rod 126 to urge the same toward the regulator valve 14. This embodiment effects such a line pressure variation characteristic as shown in the graph of FIG. 5 and can produce substantially the same effect as the previous embodiments.

What is claimed is:

1. A line pressure control device for a hydraulic control system of an automatic transmission, comprising:
 a fluid pump for producing a line pressure;
 line pressure passage means connected to said fluid pump for distributing said line pressure;
 a source of intake manifold vacuum;

a vacuum diaphragm unit connected to said source of intake manifold vacuum for producing a variable force depending upon variations of said intake manifold vacuum; and a control valve connected to said line pressure passage means and having a valve spool movable to regulate said line pressure based upon said force applied thereto from said vacuum diaphragm unit; said vacuum diaphragm unit including a casing having an inner wall, parallel first and second diaphragms disposed within said casing, vacuum chamber means defined within said casing by one side of said first diaphragm and by one side of said second diaphragm, atmospheric pressure chamber means defined within said casing by other sides of both said first and said second diaphragms in such a manner that said first diaphragm is subject to a differential pressure by which it is urged away from said valve spool while said second diaphragm is subject to a differential pressure by which it is urged toward said valve spool, spring means for urging said first diaphragm toward said valve spool while said second diaphragm moves away from said valve spool, and rod means for connecting said first and second diaphragms to said valve spool, in which said first and second diaphragms, said spring means and said rod means are constructed and arranged so that said force reduces as said intake manifold vacuum increases and is supplied from said first diaphragm to said valve spool through said rod means when said intake manifold vacuum is lower than a first predetermined value and so that said force increases as said intake manifold vacuum increases and is supplied from said second diaphragm to said valve spool through said rod means when said intake manifold vacuum is higher than a second predetermined value.

2. A line pressure control device as set forth in claim 1, further comprising a regulator valve connected to said line pressure passage means for regulating said line pressure based on throttle pressure, said control valve being a throttle valve for producing said throttle pressure.

3. A line pressure control device as set forth in claim 2, in which said casing has opposed axial ends, said vacuum chamber means having a first vacuum chamber defined between one of said axial ends of said casing said first diaphragm and a second vacuum chamber defined between the other of said axial ends of said casing and said second diaphragm, said atmospheric pressure chamber means having an atmospheric pressure chamber interposed between said first and second vacuum chambers, said spring means having a first coil spring received in said first vacuum chamber and interposed between said one axial end of aid casing and said first diaphragm and a second coil spring received in said second vacuum chamber and interposed between said other axial end of said casing and said second diaphragm, said rod means having concentric first and second rods, said second rod being hollow and having an axial end sealingly secured to said second diaphragm and the other axial end abuttingly engageable with an end of said valve spool, said first rod being movably received in said second rod and extending therethrough to have opposite ends at which it is abuttingly engageable with said first diaphragm and said end of said valve spool, respectively.

4. A line pressure control device as set forth in claim 3, in which said first and second diaphrams have substantially the same effective area.

5. A line pressure control device as set forth in claim 4, in which said first and second predetermined values are equal to each other.

6. A line pressure control device as set forth in claim 4, further comprising spring means for urging said valve spool in the direction increasing said line pressure.

7. A line pressure control device as set forth in claim 6, in which said second predetermined value is larger than said first predetermined value and in which said first and second coil springs are constructed so that said valve spool is biased by said second mentioned spring means only when said intake manifold vacuum ranges between said first and second predetermined values.

8. A line pressure control device as set forth in claim 2, in which said vacuum chamber means having a vacuum chamber between said first and second diaphragms, said second diaphragm being located remoter from said valve spool and having an effective area larger than that of said first diaphragm, said atmospheric pressure means having a first atmospheric pressure chamber located on the side of said first diaphragm opposite to said vacuum chamber and second atmospheric pressure chamber located on the side of said second diaphragm opposite to said vacuum chamber, said spring means having a first coil spring received in said vacuum chamber and interposed between said first and second diaphragms and a second coil spring having an end fixedly held on said casing abutting upon said second spring, said rod means having a rod and an annular transfer member, said rod having an end secured to said first diaphragm and the other end abuttingly engaged with said end of said valve spool, said transfer member being received in said vacuum chamber and secured at an end to said first diaphragm and abuttingly engageable at the other end with said second diaphragm.

9. A line pressure control device as set forth in claim 8, in which said first and second predetermined values are equal to each other.

10. A line pressure control device as set forth in claim 9, further comprising spring means for urging said valve spool in the direction increasing said line pressure.

11. A line pressure control device as set forth in claim 10, in which said second predetermined value is larger than said first predetermined value and in which said first and second coil springs are constructed so that said valve spool is biased by said second mentioned spring means only when said intake manifold vacuum ranges between said first and second predetermined values.

12. A line pressure control device for a hydraulic control system of an automatic transmission, comprising:

a fluid pump for producing a line pressure;
line pressure passage means connected to said fluid pump for distributing said line pressure;
a source of intake manifold vacuum;
a vacuum diaphragm unit connected to said source of intake manifold vacuum for producing a variable force depending upon variations of said intake manifold vacuum; and
a control valve connected to said line pressure passage means and having a valve spool movable to regulate said line pressure based upon said force applied thereto from said vacuum diaphragm unit;

said vacuum diaphragm unit including a casing having an inner wall, parallel first and second diaphragms disposed within said casing, said casing having opposed axial ends, vacuum chamber means defined within said casing by one side of said first diaphragm and by one side of said second diaphragm, said vacuum chamber means having a first vacuum chamber defined between one of said axial ends of said casing and said first diaphragm and a second vacuum chamber defined between the other of said axial ends of said casing and said second diaphragm, atmospheric pressure chamber means defined within said casing by other sides of both said first and said second diaphragms in such a manner that said first diaphragm is subject to a differential pressure by which it is urged away from said valve spool while said second diaphragm is subject to a differential pressure by which it is urged toward said valve spool, said atmospheric pressure chamber means having an atmospheric pressure chamber interposed between said first and second vacuum chambers, spring means for urging said first diaphragm toward said valve spool while said second diaphragm moves away from said valve spool, and rod means for connecting said first and second diaphragms to said valve spool, said spring means having a first coil spring received in said first vacuum chamber and interposed between said one axial end of said casing and said first diaphragm and a second coil spring received in said second vacuum chamber and interposed between said other axial end of said casing and said second diaphragm, said rod means having concentric first and second rods, said second rod being hollow and having an axial end sealingly secured to said second diaphragm and the other axial end abuttingly engageable with an end of said valve spool, said first rod being movably received in said second rod and extending therethrough to have opposite ends at which it is abuttingly engageable with said first diaphragm and said end of said valve spool respectively, said spring means and said rod means are constructed and arranged so that said force reduces as said intake manifold vacuum increases and is supplied from said first diaphragm to said valve spool through said rod means when said intake manifold vacuum is lower than a first predetermined value and so that said force increases as said intake manifold vacuum increases and is supplied from said second diaphragm to said valve spool through said rod means when said intake manifold vacuum is higher than a second predetermined value.

* * * * *